(12) United States Patent
Dalal

(10) Patent No.: US 7,151,760 B2
(45) Date of Patent: Dec. 19, 2006

(54) UNIFIED ARCHITECTURE FOR CDMA NETWORK AND METHOD OF OPERATION

(75) Inventor: Neerav N. Dalal, Plano, TX (US)

(73) Assignee: Samsung Electronics Co., Ltd., Suwon (KR)

( * ) Notice: Subject to any disclaimer, the term of this patent is extended or adjusted under 35 U.S.C. 154(b) by 571 days.

(21) Appl. No.: 09/212,852

(22) Filed: Dec. 16, 1998

(65) Prior Publication Data
US 2002/0093931 A1    Jul. 18, 2002

(51) Int. Cl.
*H04B 7/216* (2006.01)
*H04Q 7/38* (2006.01)

(52) U.S. Cl. ............. 370/335; 370/338; 370/342; 370/469; 455/450

(58) Field of Classification Search ............. 370/320, 370/342, 441, 335, 338, 469; 455/450
See application file for complete search history.

(56) References Cited

U.S. PATENT DOCUMENTS

| | | | | |
|---|---|---|---|---|
| 5,436,900 A | * | 7/1995 | Hammar et al. | |
| 5,887,256 A | * | 3/1999 | Lu et al. | 455/426 |
| 5,949,773 A | * | 9/1999 | Bhalla et al. | 370/331 |
| 6,069,883 A | * | 5/2000 | Ejzak et al. | 370/335 |
| 6,111,866 A | * | 8/2000 | Kweon et al. | 370/335 |
| 6,134,221 A | * | 10/2000 | Stewart et al. | 370/252 |
| 6,137,789 A | * | 10/2000 | Honkasalo | 370/342 |
| 6,349,224 B1 | * | 2/2002 | Lim | 455/575 |
| 6,381,455 B1 | * | 4/2002 | Smolik | 455/421 |
| 6,396,820 B1 | * | 5/2002 | Dolan et al. | 370/328 |
| 6,421,714 B1 | * | 7/2002 | Rai et al. | 709/217 |
| 6,608,832 B1 | * | 8/2003 | Forslow | 370/353 |

* cited by examiner

Primary Examiner—Alpus H. Hsu

(57) ABSTRACT

There is disclosed, for use in a CDMA wireless network, a partitioned selection and distribution unit (SDU). The partitioned SDU comprises a first controller located in at least one base station of the CDMA wireless network for performing radio dependent functions, wherein the radio dependent functions are related to the transfer of wireless traffic between base stations and mobile stations in the CDMA wireless network. The partitioned SDU also comprises a second controller located in the mobile switching center of the CDMA wireless network for performing radio independent functions, wherein the radio independent functions are related to the transfer of voice traffic, data traffic, and/or signaling traffic between the CDMA wireless network and a wired network coupled to the CDMA wireless network.

20 Claims, 4 Drawing Sheets

UNIFIED ARCHITECTURE FOR CDMA NETWORK AND METHOD OF OPERATION

TECHNICAL FIELD OF THE INVENTION

The present invention is directed, in general, to wireless networks and, more specifically, to a unified architecture for use in a CDMA wireless network.

BACKGROUND OF THE INVENTION

Wireless networks are becoming ubiquitous in society. Wireless subscribers use a wide variety of wireless devices, including cellular phones, personal communication services (PCS) devices, and wireless modem-equipped personal computer (PCs), among others. These devices are used to access both public and private networks. To maximize usage of the available bandwidth, wireless networks implement a number of multiple access technologies to allow more than one subscriber to communicate simultaneously with each base station (BS) in a wireless system. These multiple access technologies include time division multiple access (TDMA), frequency division multiple access (FDMA), and code division multiple access (CDMA). These technologies assign each system subscriber to a specific traffic channel that transmits and receives subscriber voice/data signals via a selected time slot, a selected frequency, a selected unique code, or a combination thereof.

Most wireless network architectures generally consist of a number of geographically dispersed base stations that provide wireless communications in a designated coverage area served by a wireless service provider. Groups of base stations are connected by land lines to a common mobile switching center (MSC) that provides high-level control over the group of base stations and connects the base stations to the public switched telephone network (PSTN). Each base station (BS) covers a particular geographic area (or cell) and may be comprised of one or more base transceiver stations and a base station controller (BSC).

Base station controllers and base transceiver stations are well known to those skilled in the art. A base station controller is a device that manages wireless communications resources, including the base transceiver stations, for specified cells within a wireless communications network. A base transceiver station comprises the RF transceivers, antennas, and other electrical equipment located in each cell site. This equipment may include air conditioning units, heating units, electrical supplies, telephone line interfaces, and RF transmitters and RF receivers.

A common feature of many conventional CDMA wireless network architectures is the combining or commingling of radio dependent (RF dependent) functions and radio independent (RF independent) functions within a single control system in the BS/MSC interface. This single control system is sometimes referred to as a selection and distribution unit (SDU) and it may be located within the BS, within the MSC, or intermediate the BS and the MSC. The radio dependent functions of an SDU include CDMA power control functions, diversity functions to support CDMA soft handoff (i.e., selection and distribution), radio link protocol (RLP) and multiplexing and de-multiplexing of voice and/or data traffic. The radio independent functions of an SDU include vocoding and transcoding, IP router for Internet packet data and modem pools for circuit data and fax applications.

There are drawbacks, however, in any network architecture that combines radio dependent and radio independent functions together in a single SDU or equivalent control system. The location of the SDU can create incompatibilities in architectures that use components from different vendors. For example, if vendor A places SDU functions in its MSC (but not in its BS) and vendor B places SDU functions in its BS (but not in its MSC), a wireless network operator would not be able to build a network using an MSC from vendor B and a BS from vendor A, since neither contains an SDU. This also means that if components in a wireless network are being replaced or retrofitted, the network operator can buy equipment only from vendors who install the SDU functionality in locations compatible with the other equipment in the wireless network.

There is therefore a need in the art for an improved CDMA wireless network architecture that is less susceptible to incompatibilities between the equipment of different vendors. In particular, there is a need in the art for a CDMA architecture that does not combine radio dependent and radio independent functions in a single system.

SUMMARY OF THE INVENTION

To address the above-discussed deficiencies of the prior art, it is a primary object of the present invention to provide a partitioned selection and distribution unit (SDU) for use in a CDMA wireless network comprising a plurality of base stations capable of communicating with a plurality of mobile stations located in a coverage area of the CDMA wireless network. The partitioned selection and distribution unit (SDU) comprises: 1) a first controller capable of performing radio dependent functions, wherein the radio dependent functions are related to a transfer of wireless traffic between the plurality of base stations and the plurality of mobile stations; and 2) a second controller disposed apart from the first controller and capable of performing radio independent functions, wherein the radio independent functions are related to a transfer of at least one of voice traffic, data traffic, and signaling traffic between the CDMA wireless network and a wired network coupled to the CDMA wireless network.

According to one embodiment of the present invention, the radio dependent functions comprise selection of preferred ones of incoming wireless traffic frames received from the plurality of base stations.

According to another embodiment of the present invention, the radio dependent functions comprise controlling a transmission power of a selected one of the plurality of mobile stations.

According to still another embodiment of the present invention, the radio independent functions comprise a decompression of voice traffic from a first bit rate to a second bit rate.

According to yet another embodiment of the present invention, the decompression is performed by a vocoder.

According to a further embodiment of the present invention, the radio independent functions comprise a transcoding of circuit data from a first bit rate to a second bit rate.

According to a still further embodiment of the present invention, the radio independent functions comprise a conversion of data frames received from the base stations to data packets suitable for transmission over a packet data network coupled to the CDMA wireless network.

According to a yet further embodiment of the present invention, the first controller is disposed in one of the plurality of base stations and the second controller is disposed in a mobile switching center (MSC) associated with the CDMA wireless network.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION

FIGS. 1 through 4, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged CDMA wireless network.

Figure 1:
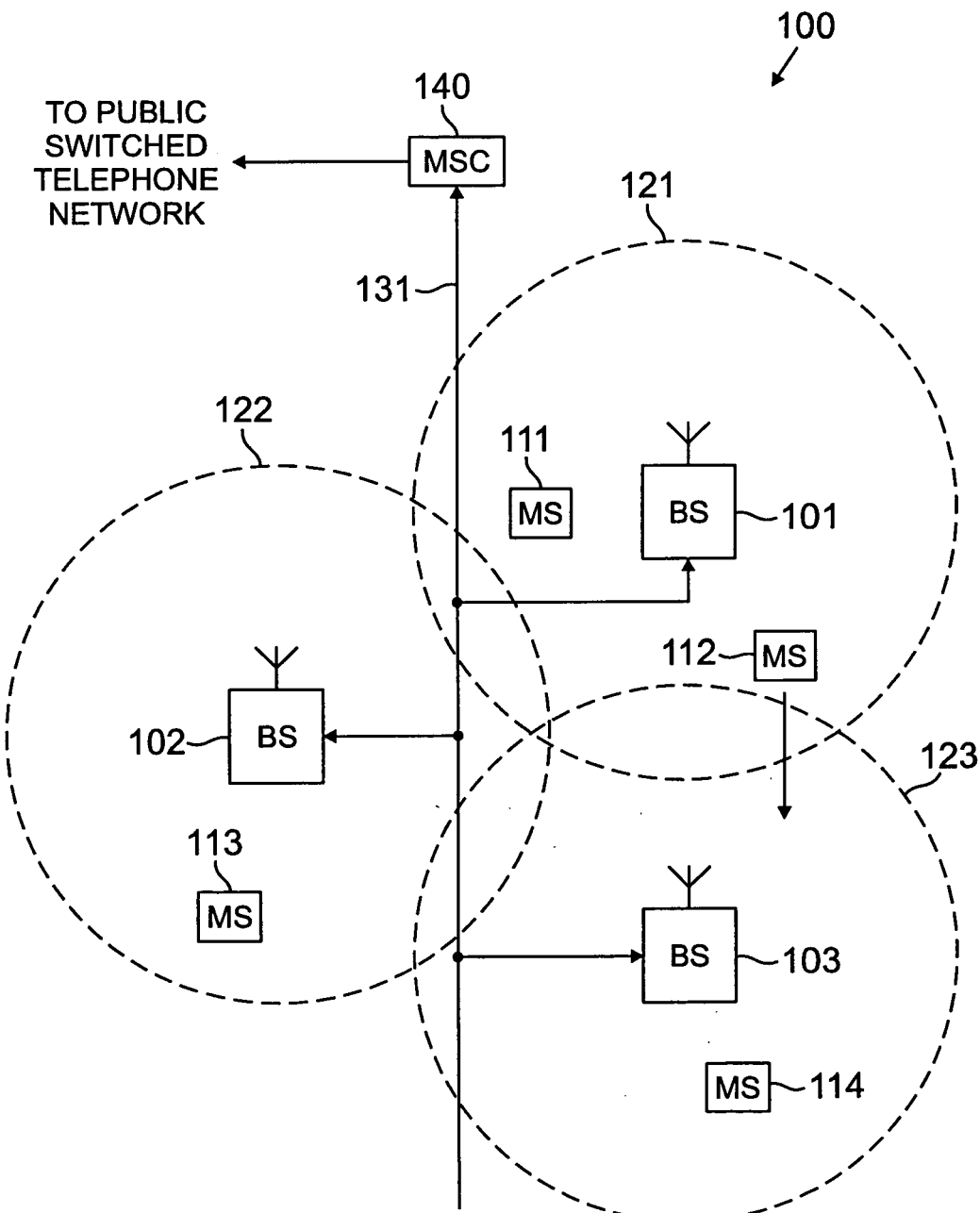
FIG. 1 illustrates an exemplary CDMA wireless network according to one embodiment of the present invention.

FIG. 1 illustrates an exemplary CDMA wireless network 100 according to one embodiment of the present invention. The wireless telephone network 100 comprises a plurality of cell sites 121–123, each containing one of the base stations, BS 101, BS 102, or BS 103. Base stations 101–103 are operable to communicate with a plurality of mobile stations (MS) 111–114. Mobile stations 111–114 may be any suitable cellular devices, including conventional cellular telephones, PCS handset devices, portable computers, metering devices, and the like.

Dotted lines show the approximate boundaries of the cells sites 121–123 in which base stations 101–103 are located. The cell sites are shown approximately circular for the purposes of illustration and explanation only. It should be clearly understood that the cell sites may have other irregular shapes, depending on the cell configuration selected and natural and man-made obstructions.

In one embodiment of the present invention, BS 101, BS 102, and BS 103 may comprise a base station controller (BSC) and a base transceiver station (BTS). For the purpose of simplicity and clarity in explaining the operation of the present invention, the base transceiver station in each of cells 121, 122, and 123 and the base station controller associated with each base transceiver station are collectively represented by BS 101, BS 102 and BS 103, respectively.

BS 101, BS 102 and BS 103 transfer voice and data signals between each other and the public telephone system (not shown) via communications line 131 and mobile switching center (MSC) 140. Communications line 131 may be any suitable connection means, including a T1 line, a T3 line, a fiber optic link, a network backbone connection, and the like. Mobile switching center 140 is well known to those skilled in the art. Mobile switching center 140 is a switching device that provides services and coordination between the subscribers in a wireless network and external networks, such as the public telephone system. In some embodiments of the present invention, communications line 131 may be several different data links, where each data link couples one or more of BS 101–103 to MSC 140 and/or a selection and distribution unit.

In the exemplary wireless network 100, MS 111 is located in cell site 121 and is in communication with BS 101, MS 113 is located in cell site 122 and is in communication with BS 102, and MS 114 is located in cell site 123 and is in communication with BS 103. The MS 112 is also located in cell site 121, close to the edge of cell site 123. The direction arrow proximate MS 112 indicates the movement of MS 112 towards cell site 123. At some point, as MS 112 moves into cell site 123 and out of cell site 121, a "handoff" will occur.

As is well know, the "handoff" procedure transfers control of a call from a first cell to a second cell. For example, if MS 112 is in communication with BS 101 and senses that the signal from BS 101 is becoming unacceptably weak, MS 112 may then switch to a BS that has a stronger signal, such as the signal transmitted by BS 103. MS 112 and BS 103 establish a new communication link and a signal is sent to BS 101 and the public telephone network to transfer the on-going voice, data, or control signals through BS 103. The call is thereby seamlessly transferred from BS 101 to BS 103. An "idle" handoff is a handoff between cells of a mobile device that is communicating in the control or paging channel, rather than transmitting voice and/or data signals in the regular traffic channels.

Figure 2:
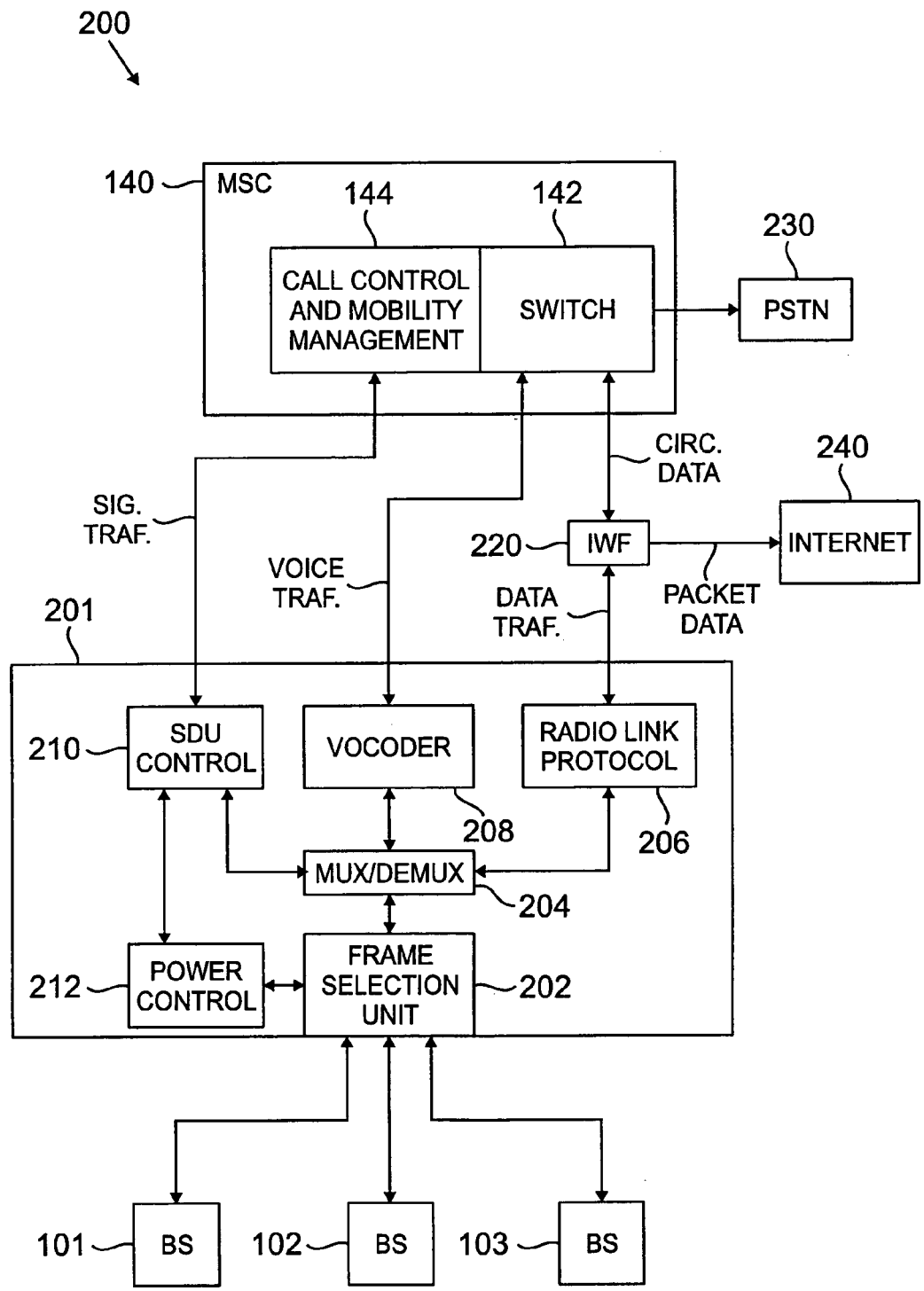
FIG. 2 illustrates an exemplary SDU for use in conventional CDMA architecture according to one embodiment of the prior art.

FIG. 2 illustrates exemplary SDU 201 for use in conventional CDMA architecture 200 according to one embodiment of the prior art. In the illustrated embodiment, SDU 201 is part of the BS/MSC interface and is disposed proximate, and perhaps within, MSC 140. In alternate embodiments, one or more SDUs 201 may be located within one or more of BS 101–103. SDU 201 comprises frame selection unit 202, multiplexer-demultiplexer 204, radio link protocol (RLP) unit 206, vocoder unit 208, SDU control 210 and power control 212. CDMA architecture 200 further comprises interworking function (IWF) controller 220 and, within MSC 140, switch 142 and call control and mobility management (CCMM) unit 144. Switch 142 interfaces CDMA architecture 200 with public switch telephone network 230 and IWF unit 220 interfaces CDMA architecture 200 with internet 240.

Frame selection unit 202 transfers voice traffic frames, data traffic frames, and signaling traffic frames to and from BS 101–103. The soft handoff capability of a CDMA wireless network means that frames transmitted by a single mobile station may be received by multiple base stations and forwarded to SDU 201, resulting in redundant data being received by frame selection unit 202. For each soft handoff call handled by BS 101–103, frame selection unit 202 selects the frames from BS 101–103 that come from the highest quality received signal and discards the remaining redundant frames. Frame selection unit 202 sends the frames to multiplexer-demultiplexer 204, which selectively relays frames to RLP unit 206, vocoder unit 208, SDU control 210 according to frame type. In the reverse direction, multiplexer-demultiplexer 204 receives frames from RLP unit 206, vocoder unit 208, and SDU control 210 and relays the frames to frame selection unit 202.

Data traffic frames are sent to RLP unit 206, voice traffic frames are sent to vocoder 208, and signal traffic frames are sent to SDU control 210. Frame selection unit 202 also sends signal strength information related to frames received from BS 101–103 to power control 212. Power control 212 and CDMA architecture 200 use this information to transmit to MS 111–114 power control signals that adjust the transmission power of MS 111–114.

The data traffic sent to RLP unit 206 includes fax data, circuit data and packet (IP) data. RLP unit 206 relays the data traffic to IWF unit 220, which sends the data to PSTN 230 or internet 240 according to data type. Fax data and circuit data are sent to switch 142 in MSC 140 and then to PSTN 230. Packet data are sent to internet 240. IWF unit 220 contains, among other things, transcoding circuitry that may receive data from BS 101–103 at, for example, an 8 Kbps rate and may then re-format the 8 Kbps data to a 64 Kbps rate before sending it to switch 142. In the reverse direction, IWF 220 converts circuit data, fax data, and packet data back to 8 Kbps format.

Vocoder 208 receives compressed voice traffic from BS 101–103 at, for example, an 8 Kbps rate and decompresses the voice traffic to 64 Kbps. The 64 Kbps data is then sent to switch 142 and PSTN 230. In the reverse direction, vocoder 208 compresses 64 Kbps voice data received from PSTN 230 via switch 142 back to an 8 Kbps rate.

SDU control 210 receives signaling traffic from MS 111–114 via BS 101–103. MS 111–114 may transmit two types of signaling traffic to BS 101–103: On-call signaling traffic and Off-call signaling traffic. Off-call signaling traffic is transmitted to a base station in control channels in order to set up and break down a call connection. On-call signaling traffic is transmitted in normal traffic channels during the call and includes caller-activated features as three-way calling and the like. In the illustrated embodiment, on-call signaling traffic is relayed to CCMM 144 via SDU 201 and SDU control 210. Off-call signaling traffic may bypass SDU 201 and be transferred directly to CCMM 144 on separate communication lines (not shown). SDU control 210 is also responsible for controlling the overall operation of the other components in SDU 201. In particular, SDU 210 interfaces between power control 212 and CCMM 144.

It is apparent that SDU 201 mixes together a number of radio dependent functions (power control, radio link protocol, diversity between base stations to support soft handoff) and a number of radio independent functions (vocoding and transcoding). This makes the location of SDU 201 critical in some architectures and can lead to incompatibilities and/or redundancies among the equipment produced by different manufacturers.

Figure 3:
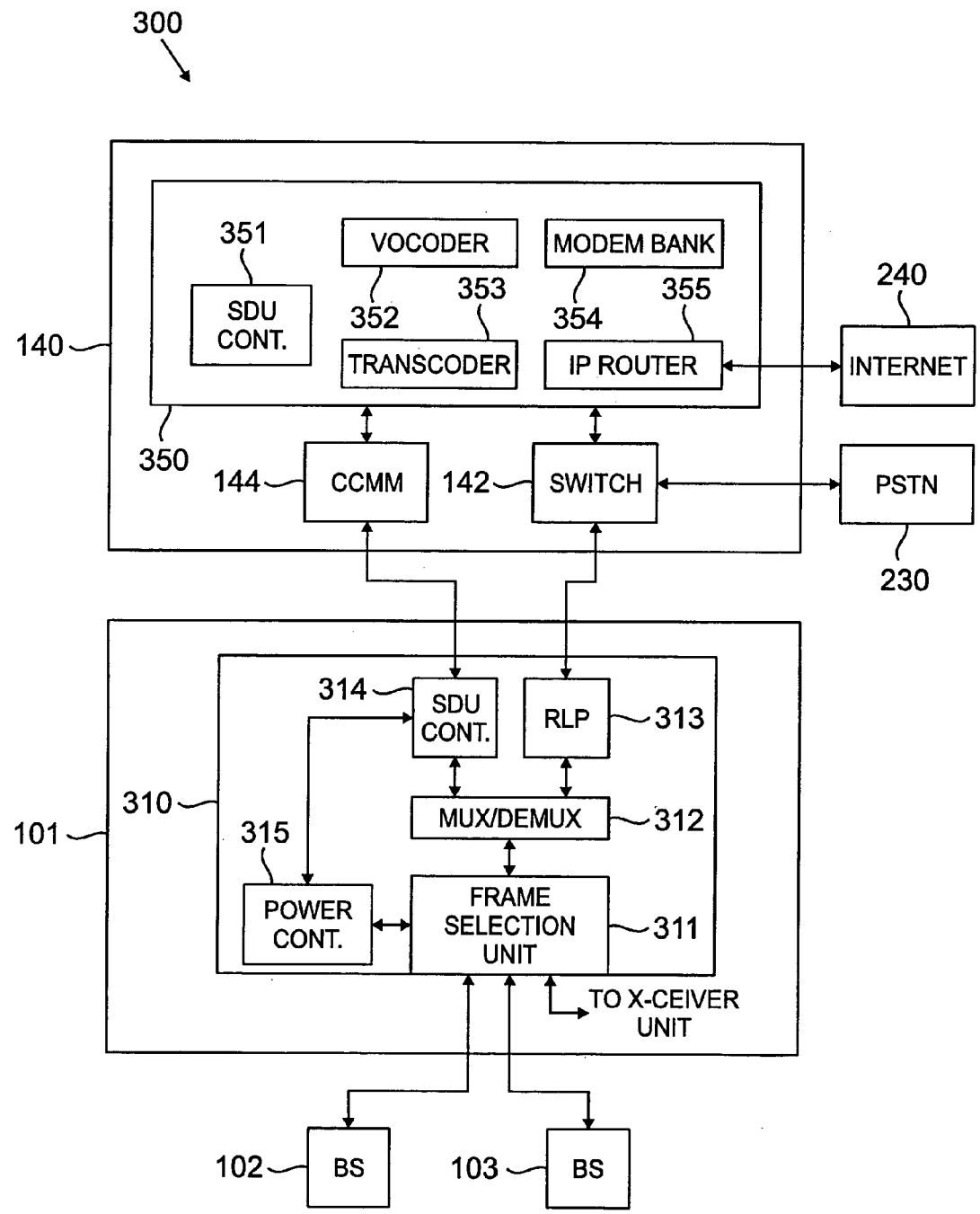
FIG. 3 illustrates an exemplary SDU for use in an improved CDMA architecture according to one embodiment of the present invention.

FIG. 3 illustrates exemplary CDMA architecture 300 comprising a partitioned selection and distribution unit (SDU) according to one embodiment of the present invention. The partitioned selection and distribution unit comprises SDU 310, located in base station 101, and SDU 350, located in mobile switching station 140. SDU 310 and SDU 350 separate radio dependent functions and radio independent functions, thereby reducing incompatibility and redundancy between and among the equipment of different vendors.

SDU 310 comprises frame selection unit (FSU) 311, multiplexer-demultiplexer unit 312, radio link protocol (RLP) unit 313, SDU control 314, and power control 315. Frame selection unit 311 transfers voice traffic frames, data traffic frames, and signaling traffic frames to and from the transceiver (X-ceiver) unit in BS 101 and to and from BS 102 and BS 103. As before, for each soft handoff call handled by BS 101–103, frame selection unit 311 selects the frames from BS 101–103 that come from the highest quality received signal and discards the remaining redundant frames. Frame selection unit 311 sends the frames to multiplexer-demultiplexer 312, which selectively relays frames to RLP unit 313, switch 142 or SDU control 314 according to frame type. In the reverse direction, multiplexer-demultiplexer 312 receives frames from RLP unit 313, switch 142, and SDU control 314 and relays the frames to frame selection unit 311.

Signal traffic frames are sent to SDU control 314. Voice and data traffic frames may both be sent to RLP unit 313. Alternatively, voice traffic frames may be sent directly to switch 142 from multiplexer-demultiplexer 312 (connection not shown), thereby by-passing RLP unit 313. Frame selection unit 311 also sends signal strength information related to frames received from BS 101–103 to power control 315. Power control 315 uses this information to transmit to MS 111–114 power control signals that adjust the transmission power of MS 111–114.

In addition to SDU 350, MSC 140 further comprises switch 142 and call control and mobility management (CCMM) unit 144. SDU 350 comprises SDU control 351, vocoder 352, transcoder 353, modem bank 354, and IP router 355. Switch 142 interfaces CDMA architecture 300 with public switch telephone network 230 and IP router 355 interfaces CDMA architecture 300 with internet 240.

SDU control 351 controls the overall operation of SDU 350. The data traffic frames received by RLP unit 313 from multiplexer-demultiplexer include voice data, fax data, circuit data and packet (IP) data. RLP unit 313 relays the mixed data traffic to switch 142, which switches voice traffic frames to vocoder 352, circuit data frames to transcoder 353, and packet data frames to IP router 355 for further processing. Vocoder 352 decompresses the voice data from 8 Kbps to 64 Kbps. The decompressed voice is sent to switch 142, which sends the voice data to PSTN 230. Similarly, transcoder 353 sends fax data and circuit data to modem bank 354. The fax and circuit data are then sent to switch 142, which sends the fax and circuit data to PSTN 230. IP router 355 sends packet data directly to internet 240.

Signaling traffic frames are sent from SDU control 314 to CCMM unit 144. As before, on-call signaling traffic may be relayed to CCMM 144 from BS 101–103 via SDU 310 and SDU control 314, while off-call signaling traffic may bypass SDU 310 and be transferred directly to CCMM 144 on separate communication lines (not shown).

Figure 4:
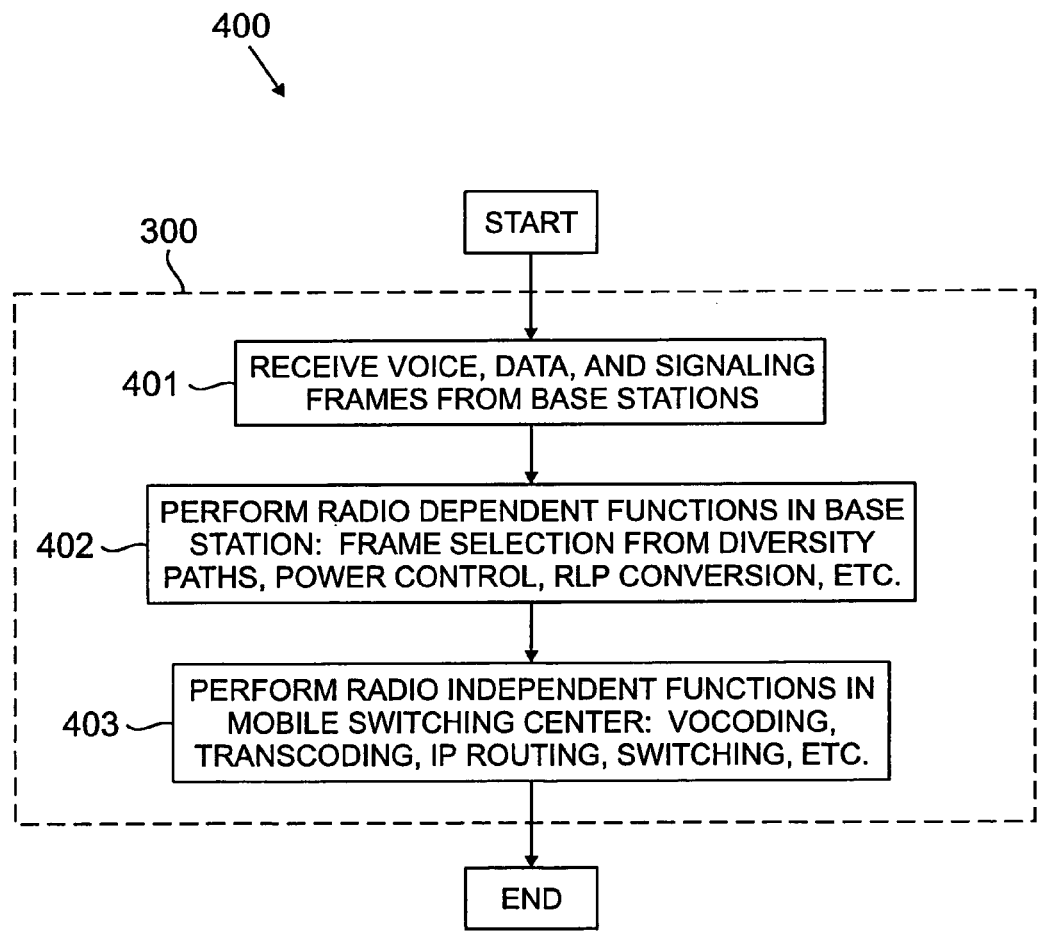
FIG. 4 is a flow diagram illustrating the operation of CDMA architecture in accordance with one embodiment of the present invention.

FIG. 4 depicts flow diagram 400 illustrating the operation of CDMA architecture 300 in accordance with one embodiment of the present invention. In the normal course of operations of CDMA architecture 300, SDU 310, located in one of BS 101–103, receives voice, data and signaling traffic from BS 101–103 (process step 401). All radio dependent functions are then performed on the voice, data, and signaling frames, including frame selection from diversity paths for soft handoff calls, power control, RLP conversion and the like (process step 402). Next, the voice, data, and signaling frames are transferred as data packets to SDU 350 in MSC 140. All radio independent functions are then performed on the mixed data packets received from SDU 310, including vocoding, transcoding, IP routing, switching and the like (process step 403).

As FIGS. 3 and 4 illustrate, the present invention separates radio independent functions and radio dependent between the mobile switching center and the base station(s). Since the radio units (i.e., RF transceivers) are in BS 101–103, radio dependent functions, such as frame selection and distribution, power control and radio link protocol are also located in BS 101–103. The radio independent functions, such as transcoding, vocoding, and separation of voice and data packets, are located in MSC 140. Advantageously, this separation facilitates the evolution of compatible vendor equipment in the future. Additionally, any modification to, for example, a radio dependent function in BS 101–103 does not necessitate a change in MSC 140. Similarly, any modification to a radio independent function, such as transcoding, does not necessitate changes in BS 101–103.

Although the present invention has been described in detail, those skilled in the art should understand that they can make various changes, substitutions and alterations herein without departing from the spirit and scope of the invention in its broadest form.

What is claimed is:

1. For use in a CDMA wireless network comprising a plurality of base stations capable of communicating with a plurality of mobile stations located in a coverage area of said CDMA wireless network, a partitioned selection and distribution unit (SDU) comprising:
    a first controller associated with a first one of said plurality of base stations capable of performing a radio link protocol function related to wireless communication links between said first base station and at least one of said plurality of mobile stations; and
    a second controller associated with a mobile switching center (MSC) of said CDMA wireless network capable of performing a radio independent function related to transmission of wireline data comprising at least one of voice traffic and data traffic between said CDMA wireless network and a wired network coupled to said CDMA wireless network, wherein said radio independent function comprises at least one of converting a bit rate of voice traffic, converting a bit rate of circuit data, and processing data traffic.

2. The partitioned SDU set forth in claim 1 wherein said radio link protocol function comprises selection of preferred ones of incoming wireless traffic frames received from said first base station.

3. The partitioned SDU set forth in claim 1 wherein said radio link protocol function comprises controlling a transmission power of a selected one of said plurality of mobile stations.

4. The partitioned SDU set forth in claim 1 wherein said radio independent function further comprises a decompression of voice traffic from a first bit rate to a second bit rate.

5. The partitioned SDU set forth in claim 4 wherein said decompression is performed by a vocoder.

6. The partitioned SDU set forth in claim 1 wherein said radio independent function further comprises a transcoding of circuit data from a first bit rate to a second bit rate.

7. The partitioned SDU set forth in claim 1 wherein said radio independent function further comprises a conversion of data frames received from said first base station to data packets suitable for transmission over a packet data network coupled to said CDMA wireless network.

8. The partitioned SDU set forth in claim 1 wherein said radio independent function further comprises a separation of voice and data packets.

9. The partitioned SDU set forth in claim 1 wherein said first controller is disposed in said first base station and said second controller is disposed in said MSC.

10. A CDMA wireless network capable of communicating with a plurality of mobile stations located in a coverage area of said CDMA wireless network, said CDMA wireless network comprising;
    a plurality of base stations capable of wirelessly communicating with said plurality of mobile stations, a first one of said plurality of base stations comprising a first controller capable of performing a radio link protocol function related to wireless communication links between said first base station and said plurality of mobile stations; and
    a mobile switching center capable of transferring call traffic between said plurality of base stations and a wired network coupled to said CDMA wireless network, said mobile switching center comprising a second controller capable of performing a radio independent function related to transmission of wireline data comprising at least one of voice traffic and data traffic between said CDMA wireless network and said wired network, wherein said radio independent function comprises at least one of converting a bit rate of voice traffic, converting a bit rate of circuit data, and processing data traffic.

11. The CDMA wireless network set forth in claim 10 wherein said radio link protocol function comprises selection of preferred ones of incoming wireless traffic frames received from said first base station.

12. The CDMA wireless network set forth in claim 10 wherein said radio link protocol function comprises controlling a transmission power of a selected one of said plurality of mobile stations.

13. The CDMA wireless network set forth in claim 10 wherein said physical radio independent function further comprises a decompression of voice traffic from a first bit rate to a second bit rate.

14. The CDMA wireless network set forth in claim 13 wherein said decompression is performed by a vocoder.

15. The CDMA wireless network set forth in claim 10 wherein said radio independent function further comprises a transcoding of circuit data from a first bit rate to a second bit rate.

16. The CDMA wireless network set forth in claim 10 wherein said radio independent function further comprises a conversion of data frames received from said first base station to data packets suitable for transmission over a packet data network coupled to said CDMA wireless network.

17. The CDMA wireless network set forth in claim 10 wherein said radio independent function further comprises a separation of voice and data packets.

18. A method of operating a CDMA wireless network comprising a plurality of base stations capable of communicating with a plurality of mobile stations located in a coverage area of the CDMA wireless network, the method comprising the steps of:

receiving in a first base station at least one of voice traffic and data traffic transmitted by a selected one of the plurality of mobile stations;

performing in the first base station a radio link protocol function related to wireless communication links between the first base station and the selected mobile station; and performing in a mobile switching station of the CDMA wireless network a radio independent function related to transmission of wireline data comprising at least one of voice traffic and data traffic between the CDMA wireless network and a wired network coupled to the CDMA wireless network, wherein the radio independent function comprises at least one of converting a bit rate of voice traffic, converting a bit rate of circuit data, and processing data traffic.

19. The method set forth in claim 18 wherein the radio link protocol function comprises at least one of selection of preferred ones of incoming wireless traffic frames received from the first base station and controlling a transmission power of a selected one of the plurality of mobile stations.

20. The method set forth in claim 18 wherein the radio independent function further comprises at least one of decompressing voice traffic from a first bit rate to a second bit rate, transcoding circuit data from a first bit rate to a second bit rate, and converting data frames received from said first base station to data packets suitable for transmission over a packet data network coupled to said CDMA wireless network.

\* \* \* \* \*